(12) United States Patent
Furumi

(10) Patent No.: US 8,619,743 B2
(45) Date of Patent: Dec. 31, 2013

(54) RADIO COMMUNICATION TERMINAL AND RADIO COMMUNICATION METHOD

(75) Inventor: Junichi Furumi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1181 days.

(21) Appl. No.: 12/088,677

(22) PCT Filed: Sep. 20, 2006

(86) PCT No.: PCT/JP2006/318639
§ 371 (c)(1),
(2), (4) Date: Mar. 28, 2008

(87) PCT Pub. No.: WO2007/046210
PCT Pub. Date: Apr. 26, 2007

(65) Prior Publication Data
US 2009/0268703 A1    Oct. 29, 2009

(30) Foreign Application Priority Data
Sep. 29, 2005    (JP) ................. 2005-285228

(51) Int. Cl.
*H04B 7/216* (2006.01)
*H04J 1/16* (2006.01)
*H04W 4/00* (2009.01)
*H04L 12/66* (2006.01)
*H04M 11/00* (2006.01)
*G06F 15/16* (2006.01)

(52) U.S. Cl.
USPC .......... 370/342; 370/216; 370/329; 370/354; 455/421; 709/200

(58) Field of Classification Search
USPC ............ 709/200; 455/421; 370/216, 354, 329
See application file for complete search history.

(56) References Cited

U.S. PATENT DOCUMENTS

| 6,028,851 | A  | * | 2/2000  | Persson et al. | 370/329 |
|-----------|----|----|---------|----------------|---------|
| 6,952,416 | B1 | * | 10/2005 | Christie, IV   | 370/354 |
| 7,536,451 | B2 |    | 5/2009  | Ahn et al.     |         |
| 2004/0243661 | A1 | * | 12/2004 | Ahn et al.   | 709/200 |
| 2006/0245350 | A1 | * | 11/2006 | Shei et al.  | 370/216 |
| 2006/0246885 | A1 | * | 11/2006 | Lee          | 455/421 |

FOREIGN PATENT DOCUMENTS

| JP | 09121241 A       | 5/1997 |
|----|------------------|--------|
| JP | 2005-136615      | 5/2005 |
| KR | 1020030035163 A  | 5/2003 |

OTHER PUBLICATIONS

Korean language office action and its English language translation for corresponding Korean application 10-2008-7008062.

* cited by examiner

Primary Examiner — Ian N Moore
Assistant Examiner — Kiet Tang
(74) Attorney, Agent, or Firm — DLA Piper LLP (US)

(57) ABSTRACT

A radio communication terminal that performs data communication by selecting either one of a first data communication protocol and a second data communication protocol that has a lower level of priority than that of the first data communication protocol, comprising: a communication protocol determining part (6c) that determines whether or not a base station that is performing a communication is compatible with the first data communication protocol; a session status determining part (6f) that determines whether or not the establishment of communication session layers that perform the exchanging of the parameters required for communication with the base station has been completed; and a communication control part (6a) that selects either one of the first data communication protocol and the second data communication protocol based on a determination of the communication protocol determining part, and performs data communication on a selected protocol, wherein when the communication control part (6a) begins data communication via a base station which it has been determined is compatible with the first data communication protocol, the communication control part (6a) makes a data communication request using the first data communication protocol if it is determined by the session status determining part that a communication session layer establishment has been completed, the communication control part (6a) defers the data communication request until the completion the communication session layer establishment if it is determined that the establishment has not been completed.

8 Claims, 2 Drawing Sheets

RADIO COMMUNICATION TERMINAL AND RADIO COMMUNICATION METHOD

TECHNICAL FIELD

The present invention relates to a radio communication terminal and a radio communication method.
Priority is claimed on Japanese Patent application No. 2005-285228, filed Sep. 29, 2005, the contents of which are incorporated herein by reference.

BACKGROUND ART

In recent years, the CDMA2000 1xEV-DO (Code division Multiple Access 2000 1x Evolution Data Only) standard has been developed as a next-generation high-speed radio communication protocol. As a standard obtained by standardizing an HDR (High Data Rate) standard which is a CDMA2000 1x expansion standard, this CDMA2000 1xEV-DO standard has been standardized as Std. T-64 1S-2000C.S.0024 "CDMA2000 High Rate Packet Data Air Interface Specification" in the Association of Radio Industries and Businesses (ARIB), and is a standard obtained by expanding ARIB T-53 (in Japan) and EIA/TIA/IS-95 (in the US and Korea and the like) that is designed in order to improve communication speeds by further specializing for data communication a CDMA2000 1x standard that has been compatible with the third-generation standard (3 G) (see, for example, Patent document 1 described below).

Currently, communication networks that employ a CDMA2000 1x EV-DO standard (referred to below as an EV-DO standard) is concentrated in limited areas such as urban areas. Because of this, in a communication area that is not compatible with the EV-DO standard, radio communication terminals for the EV-DO standard perform communication by first performing a hand-down to the CDMA2000 1x standard (referred to below as a 1x standard) that is common nationwide, while in a communication area that is compatible with the EV-DO standard, communication is performed by establishing an EV-DO standard communication connection (i.e., establishing a communication session layer) by establishing a session with a base station and performing session configuration using SMP (Session Management Protocol) which is a communication protocol for the EV-DO standard. Here, 'establishing a session' refers to a state in which an identification ID known as a UATI (Unicast Access Terminal Identify) is allocated from the network side to a radio communication terminal. "Session configuration" is the carrying out of negotiations such as exchanging parameters relating to the setting of protocols when communication is being performed using the EV-DO standard.

Note that radio communication terminals for the EV-DO standard are described below as AT terminals (i.e., Access Terminals).

[Patent document 1] Japanese Patent Application Laid-Open (JP-A) No. 2005-136615

DISCLOSURE OF THE INVENTION

Problems Solved by the Invention

In a conventional AT terminal, when a packet transmission request is received from a user immediately after a device has been turned on, then provided that the communication area is compatible with the EV-DO standard, a packet transmission operation to transmit to a base station is performed even if session establishment and session configuration have not been completed. In this case, the packet transmission operation definitely fails because a communication session layer that is based on the EV-DO standard has not been established. An AT terminal only makes a limited number of retry attempts if a packet transmission operation fails, and if the number of failed retry attempts exceeds this limited number then communication is performed after the standard has performed a hand-down to a 1x standard.

In this manner, in a conventional AT terminal, immediately after the power has been turned on, even if a communication session layer has not been established, packet transmission operations are performed resulting in retry attempts being made to no avail. As a result, irrespective of whether the communication area is compatible with the EV-DO standard, there is a possibility that the 1x standard which has inferior communication speed compared to the EV-DO standard will end up being used. Naturally, as a means of communication, it is desirable for the EV-DO standard which has a faster communication speed to have priority of use, and using the 1x standard irrespective of whether or not the communication area is compatible with the EV-DO standard is extremely inefficient.

Means for Solving the Problems

The present invention was conceived in view of the above described circumstances and it is an object thereof in a radio communication terminal having two data communication protocols to which a priority level has been allocated to achieve an efficient method of selecting the aforementioned two data communication protocols.

In order to achieve the above described objects, a first aspect of the radio communication terminal of the present invention is radio communication terminal that performs data communication by selecting either one of a first data communication protocol and a second data communication protocol that has a lower level of priority than that of the first data communication protocol, comprising: a communication protocol determining part that determines whether or not a base station that is performing a communication is compatible with the first data communication protocol; a session status determining part that determines whether or not the establishment of communication session layers that perform the exchanging of the parameters required for communication with the base station has been completed; and a communication control part that selects either one of the first data communication protocol and the second data communication protocol based on a determination of the communication protocol determining part, and performs data communication on a selected protocol, wherein when the communication control part begins data communication via a base station which it has been determined is compatible with the first data communication protocol, the communication control part makes a data communication request using the first data communication protocol if it is determined by the session status determining part that a communication session layer establishment has been completed, the communication control part defers the data communication request until the completion the communication session layer establishment if it is determined that the establishment has not been completed.

Moreover, a second aspect of the radio communication terminal of the present invention is the above described first aspect, wherein, in the case where the data communication request transmitted using the first data communication protocol is unsuccessful though it is judged that the session layer establishment has been completed, the communication control part retries to send the data communication request up to a predetermined times.

Moreover, a third aspect of the radio communication terminal of the present invention is the above described second aspect, wherein the communication control part makes the retries using either the first or second data communication protocol based on determinations of the communication protocol determining part.

Moreover, a fourth aspect of the radio communication terminal of the present invention is the above described second aspect, wherein, in the case where the data communication request is unsuccessful using the first data communication protocol, the communication control part transmits the data communication request using the second communication protocol if the number of retries reaches the predetermined times.

Moreover, a fifth aspect of the radio communication terminal of the present invention is any of the above described first through fourth aspects, wherein the session status determining part determines that the completion of the communication session layer establishment by a completion of a completion of. a session configuration and an establishment of a session with a base station.

Moreover, a sixth aspect of the radio communication terminal of the present invention is any of the above described first through fifth aspects, wherein the first data communication protocol is the EV-DO (Evolution-Data Only) protocol, and the second data communication protocol is the CDMA2000 1x (Code Division Multiple Access 2000 1x) protocol.

A first aspect of the radio communication method of the present invention is a radio communication method in which data communication is performed by either one of a first data communication protocol and a second data communication protocol that has a lower level of priority than that of the first data communication protocol being selected, having:

a first step in which it is determined whether or not a base station that is performing a communication is compatible with the first communication protocol; a second step in which it is determined whether or not the establishment of communication session layers that perform the exchanging of the parameters required for communication with the base station has been completed; and a third step in which either one of the first data communication protocol and the second data communication protocol is selected based on a determination of the first step, and in which data communication is performed on a selected protocol, wherein when data communication is begun in the third step via a base station which it has been determined is compatible with the first data communication protocol, if it is determined in the second step that the establishing of a communication session layer has been completed, a data communication request is made using the first data communication protocol, while if it is determined in the second step that the establishing of a communication session layer has not been completed, the data communication request is deferred until it is determined that the establishing of the communication session layer has been completed.

Moreover, a second aspect of the radio communication method of the present invention is the above described first aspect, wherein, in the case where the data communication request is transmitted in the third step using the first data communication protocol is unsuccessful though it is judged that the session layer establishment has been completed, retries to transmit the data communication request up to a predetermined times.

Moreover, a third aspect of the radio communication method of the present invention is the above described second aspect, wherein the retries are repeated in the third step using either the first or second data communication protocol based on determinations of the first step.

Moreover, a fourth aspect of the radio communication method of the present invention is the above described second aspect, wherein, in the case where the data communication request is unsuccessful in the third step using the first data communication protocol, a data communication request is transmitted using the second communication protocol if the number of retries reaches a predetermined times.

Moreover, a fifth aspect of the radio communication method of the present invention is any of the above described first through fourth aspects, wherein in the second step it is determined that the completion of the communication session layer establishment by a completion of a completion of a session configuration and an establishment of a session with a base station.

Moreover, a sixth aspect of the radio communication method of the present invention is any of the above described first trough fifth aspects, wherein the first data communication protocol is the EV-DO (Evolution-Data Only) protocol, and the second data communication protocol is the CDMA2000 1x (Code Division Multiple Access 2000 1x) protocol.

Advantageous Effect of the Invention

According to the present invention, in a radio communication terminal having two data communication protocols to which a priority level has been allocated, it is possible to achieve an efficient method of choosing between the two data communication protocols. Namely, if, for example, a communication area is compatible with the EV-DO standard, it is possible to secure a higher communication speed than is the case conventionally by giving as much priority as possible to the use of the EV-DO standard.

DESCRIPTION OF THE REFERENCE SYMBOLS

1 . . . Radio communication unit, 2 . . . Key input unit, 3 . . . Display unit, 4 . . . Sound output unit, 5 . . . Camera unit, 6 . . . Control unit, 6*a* . . . Communication control part, 6*b* . . . Search function part, 6*c* . . . Communication protocol determining part, 6*d* . . . Session establishment function part, 6*e* . . . . Session configuration function part, 6*f* . . . Communication session status determining part, 7 . . . Memory unit

BEST MODE FOR CARRYING OUT THE INVENTION

Figure 1:
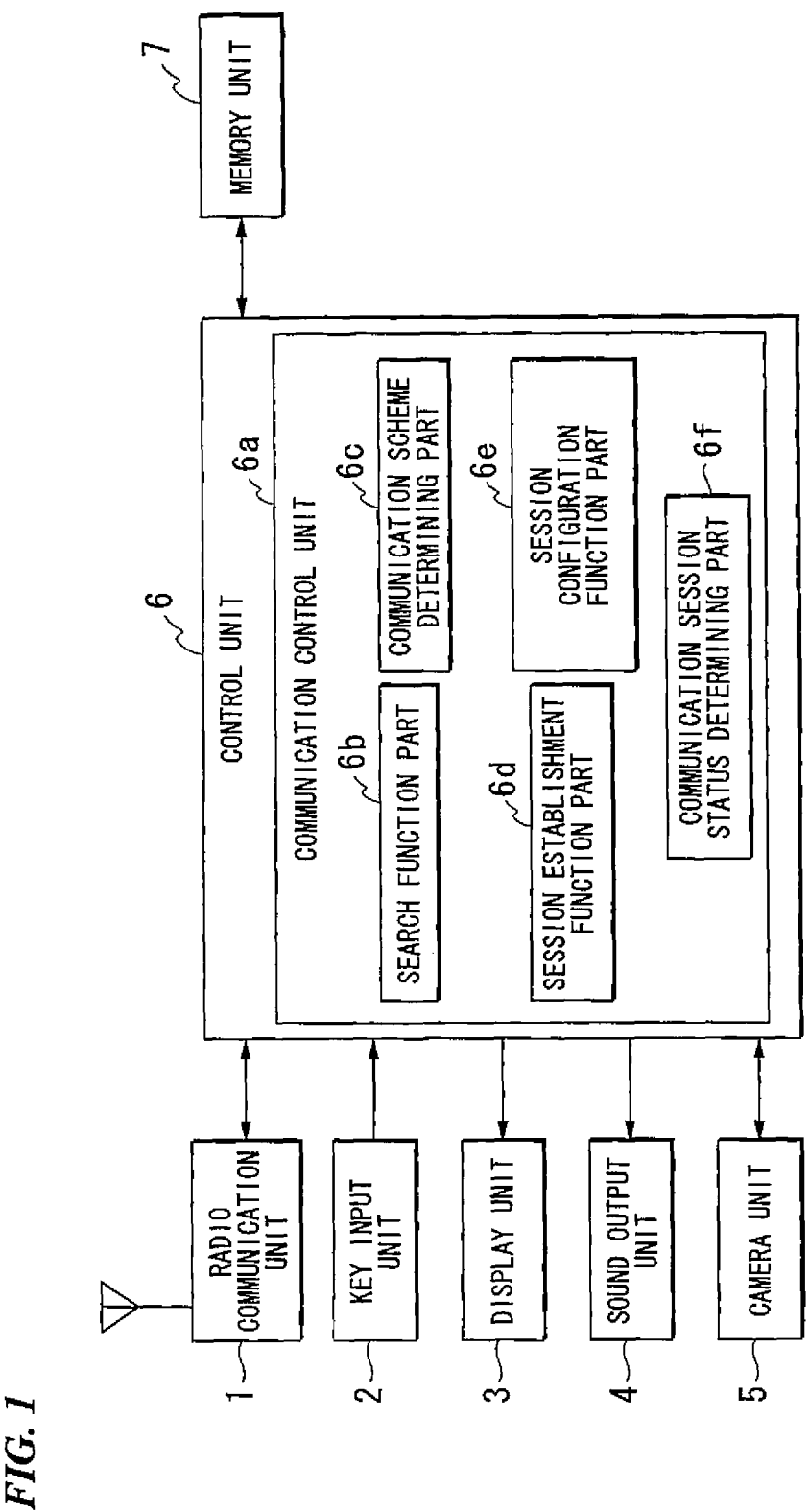
FIG. 1 is a structural block diagram of a radio communication terminal (an AT terminal) according to an embodiment of the present invention.

An embodiment of the present invention will now be described with reference made to the drawings. FIG. 1 is a block diagram showing the function structure of a radio communication terminal according to an embodiment of the present invention. Note that an AT terminal that performs data communication with a base station by selectively switching between two data communication protocols, namely, the EV-DO standard and the 1x standard, which has a lower priority level than the EV-DO standard, is described as an example of a radio communication terminal. As is shown in FIG. 1, this AT terminal is formed by a radio communication unit 1, a key input unit 2, a display unit 3, a sound output unit 4, a camera unit 5, a control unit 6, and a memory unit 7.

The radio communication unit 1 performs data communication with a base station (not shown) using either the EV-DO standard or the 1x standard under the control of the control unit 6 (specifically, the communication control part 6a). The key input unit 2 is formed by keys such as dial keys, function keys, a power supply key, and dedicated keys for requesting packet transmissions (namely, for starting data transmissions) and the like. Operating information from these keys is output as operating signals to the control unit 6.

The display unit 3 is, for example, a liquid crystal display or an organic EL display or the like, and displays various messages and images and the like based on display signals input from the control unit 6. The sound output unit 4 outputs speech and sound based on speech signals input from the control unit 6. The camera unit 5 is, for example, a CCD (Charge Coupled Device), and outputs image signals of photographed images under the control of the control unit 6.

The control unit 6 controls overall operations of this AT terminal based on predetermined control programs that have been stored in advance in the memory unit 7, on operating signals input through the key input unit 2, and on the communication state of the radio communication unit 1 and the like. In addition, the control unit 6 is provided with a communication control part 6a that has a search function part 6b, a communication protocol determining part 6c, a session establishment function part 6d, a session configuration function part 6e, and a communication session status determining part 6f.

The search function part 6b searches channels for signals transmitted from a base station via the radio communication unit 1. The communication protocol determining part 6c determines whether or not the base station is compatible with the EV-DO standard based on search results of the channels made by this search function part 6b. The session establishment function part 6d performs session establishment processing (i.e., makes a UATI allocation request) using SMP which is a communication protocol for the EV-DO standard based on determination results from the communication protocol determining part 6c (specifically, when a base station is compatible with the EV-DO standard). After the session has been established by the session establishment function part 6d, the session configuration function part 6e performs session configuration (i.e., negotiation processing such as exchanging parameters relating to the setting of protocols when communication is being performed using the EV-DO standard).

The communication session status determining part 6f determines whether or not a communication session layer has been established with a base station, namely, whether a session has been established and whether session configuration has been completed. Note that this communication session status determining part 6b determines whether or not a session has been established with a base station and whether session configuration has been completed depending on whether or not the parameters required for communication have been exchanged, as is described above. Based on determination results from the communication protocol determining part 61b and the communication session status determining part 6f, the communication control part 6a controls the radio communication unit 1 such that data communication is performed with a base station by selectively switching between two data communication protocols, namely, between the EV-DO standard and the 1x standard. Note that the processing to select one of the two data communication protocols by the communication control part 6a is described below in detail.

The memory unit 7 may be, for example, flash memory. Control programs executed by the control unit 6 are stored in advance therein, as well as parameters required for communicating that have been obtained by UATI or negotiation processing, image signals input from the camera unit 5, and various other types of data.

Figure 2:
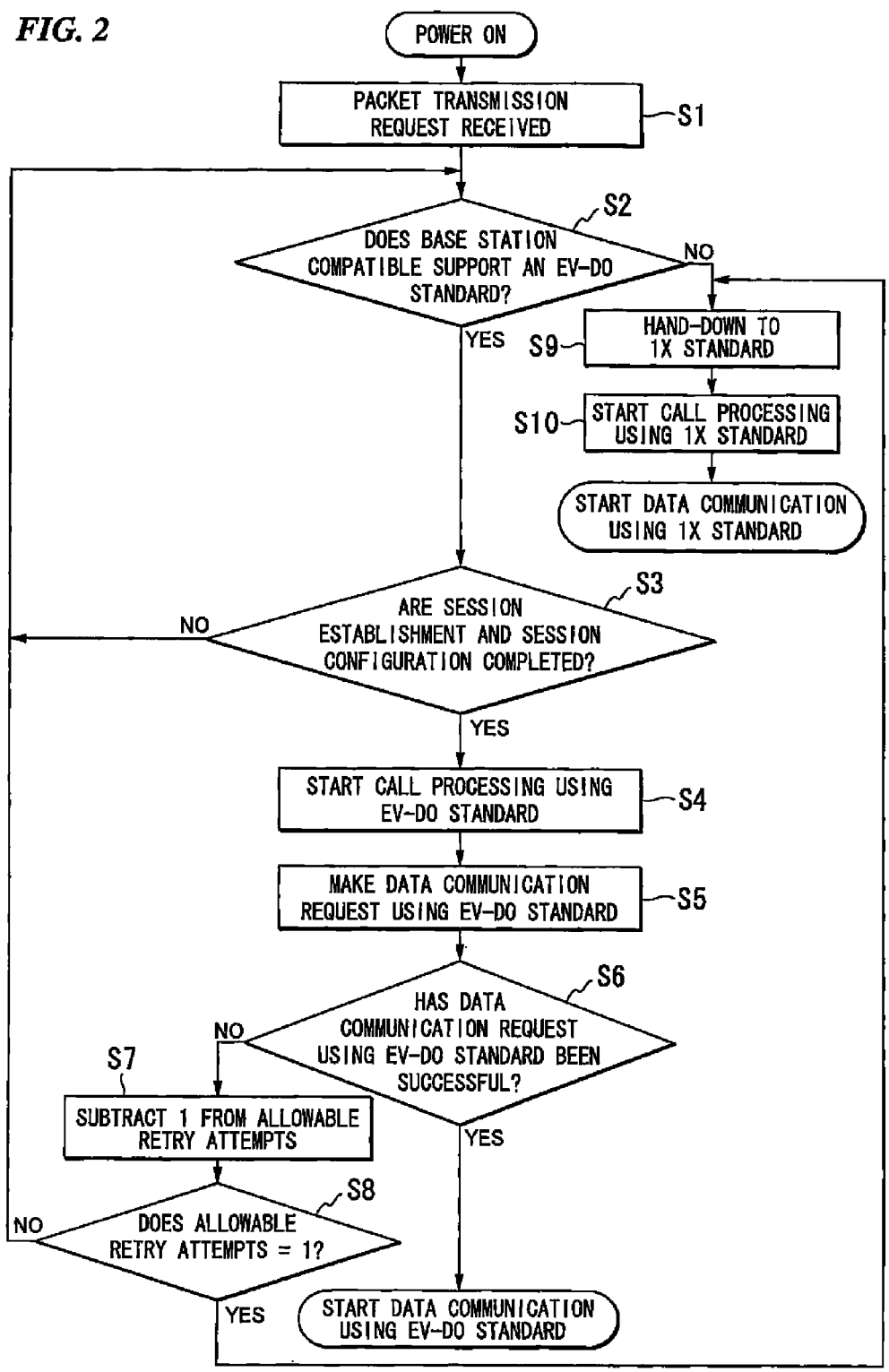
FIG. 2 is a flow chart showing an operation of an AT terminal according to au embodiment of the present invention.

Next, operations (specifically the processing to select one of the two data communication protocols by the communication control part 6a) of this AT terminal having the above described structure will be described using the flowchart shown in FIG. 2. Note that in the description below, a description is given of processing to select one of the two data communication protocols immediately after this AT terminal has been turned on, and assumes that a communication session layer of the EV-DO standard has not been established immediately after the AT terminal has been turned on (namely, that a state exists in which a session has not been established with a base station and session configuration has not been completed).

Firstly, immediately after the power is turned on, the search function part 6b starts to search channels for signals that have been sent from a base station via the radio communication unit 1. Next, if a dedicated key to start data communication is pressed by a user, namely, if a packet transmission request is received from a user (step S1), the communication protocol determining part 6c determines whether or not the base station is compatible with the EV-DO standard based on the results of the channel search made by the search function part 6b (step S2). If the result of the determination in step S2 is NO, namely, if it is determined by the communication protocol determining part 6c that the base station is not compatible with the EV-DO standard, the communication control part 6a selects the 1x standard as the data communication control standard and controls the radio communication unit 1 such that data communication with the base station is performed using this 1x standard. Namely, a hand-down to the 1x standard is made (step S9), and call processing to the base station using the 1x standard is performed (step S10). Subsequently data communication is performed with the base station using the 1x standard.

If, however, the result of the determination in step S2 is YES, namely, if it is determined by the communication protocol determining part 6c that the base station is compatible with the EV-DO standard, the communication session status determining part 6f determines whether or not a session has been established with a base station and whether session configuration has been completed (step S3). Moreover, if it is determined in step S2 that the base station is compatible with the EV-DO standard, then processing to establish a session by the session establishment function part 6d and negotiation processing to complete the session configuration by the session configuration function part 6e are performed using a different routine (i.e., a communication session layer establishment routine) from the routine shown in FIG. 2, namely, from the routine (i.e., a communication protocol selection routine) for performing selection processing to select one of the two data communication protocols.

Note that, generally, in a radio communication terminal such as an AT terminal and the like, because the processing of a plurality of routines is not performed in parallel, the processing of each routine proceeds with interrupt processing being performed respectively at predetermined timings between each routine so that when, for example, step S2 of the communication protocol selection routine has ended, the processing moves to a communication session layer establishment routine and other routines (such as the channel search processing performed by the search function part 6b), and then returns once more to the communication protocol selection routine.

Accordingly, if the result of the determination in step S3 is NO, namely, if a session has not been established and session configuration has not been completed, the routine returns to the processing of step S2, however, during this time other routines including a communication session layer establishment routine are executed by interrupt processing, and a set time elapses until there is a return to step S2 of the communication protocol selection routine.

In this manner, the processing of step S2 and step S3 is repeated, and when the result of the determination in step S3 is YES, namely, when a session has been established and session configuration has been completed, the communication control part 6a selects the EV-DO standard as the data communication protocol and controls the radio communication unit 1 such that data communication is performed with a base station using this EV-DO standard. Namely, call processing to call a base station which employs the EV-DO standard is performed (step S4). At this time, the communication control part 6a sends a negotiation request message (i.e., a data communication request) to the base station via the radio communication unit 1 (step S5).

Next, the communication control part 6a determines whether or not this data communication request using the EV-DO standard has been successful (step S6). If the result of this determination is YES, namely, if the data communication request has been successful, then data communication with the base station using the EV-DO standard is begun. If, however, the determination in step S6 is NO, namely, if the data communication request has been unsuccessful due to reasons such as the AT terminal moving outside the communication range, the communication control part 6a subtracts 1 attempt from the number of retry attempts (generally, the initial number of retry attempts is set to 3) allowable for data communication requests made using the EV-DO standard which has been set in advance (step S7), and determines whether or not this number of retry attempts is equal to a predetermined threshold value (step S8). In the present embodiment, this threshold value is set to 1.

If the result of the determination in step S8 is NO, namely, if it is determined that the number of retry attempts is not equal to the threshold value, then the processing of step S2 and subsequent steps is repeated and a data communication request using the EV-DO standard is sent again. Namely, data communication requests are repeated using the EV-DO standard until the number of retry attempts equals 1. When the result of the determination in step S8 is YES, namely, when the number of retry attempts equals 1, data communication requests using the EV-DO standard are abandoned, and there is a hand-down to the 1x standard. Data communication is then performed using the 1x standard.

As has been described above, according to the present embodiment, in a case in which the base station is compatible with the EV-DO standard but the establishment of a session with the base station and session configuration have not been completed, then even if a packet transmission request is made by a user, any data transmission request using the EV-Do standard is deferred until session establishment and session configuration have been completed. As a result, it is possible to prevent the number of retry attempts being needlessly used up, and it is possible to increase the possibility of data communication being performed using the EV-DO standard. Namely, in a radio communication terminal having two data communication protocols to which a priority level has been allocated, it is possible to efficiently select the data communication protocol having the higher priority level, so that if a base station is compatible with the EV-DO standard, it is possible to secure a higher communication speed than is the case conventionally by giving as much priority as possible to the use of the EV-DO standard.

Note that the present invention is not limited to the above described embodiment and modified examples such as those described below, for example, can be considered.

(1) As was described in the above embodiment session establishment and session configuration are in a state of not having been completed not only when a terminal has just been turned on, but also immediately after the packet communication state has transitioned to NULL during a period when the EV-DO standard has been rendered invalid and there has been a hand-down to the 1x standard. Accordingly, by applying the present invention even in cases such as this, it is possible to perform data communication with priority given to the EV-DO standard.

(2) When data communication using the EV-DO standard has ended, the communication session layer is temporarily opened, and thereafter, the relevant communication session layer establishment processing is performed again. In this manner, if a packet transmission request is made by a user immediately after data communication has ended, there is a possibility that session establishment and session configuration will not have been completed and that there will be a hand-down to the 1x standard. Accordingly, by applying the present invention even in cases such as this, it is possible to perform data communication with priority given to the EV-DO standard.

(3) In the above described embodiment, a description is given of an AT terminal that uses the EV-DO standard and the 1x standard as the two data communications standards, however, the present invention is not limited to this and, provided that the radio communication terminal selectively switches usage between two data communication protocols to which a priority level has been allocated, then the present invention can be applied to other data communication protocols or even to other terminals.

Industrial Applicability

The present invention can be used in a radio communication terminal having two data communication protocols to which a priority level has been allocated to achieve an efficient method of choosing between two data communication protocols.

The invention claimed is:

1. A radio communication terminal that performs data communication by selecting either one of a first data communication protocol and a second data communication protocol that has a lower level of priority than that of the first data communication protocol, comprising:
   a communication session status determining unit that determines whether or not the establishment of communication session layers has been completed; and
   a communication control unit that selects either one of the first data communication protocol and the second data communication protocol and performs data communication on a selected protocol, wherein
   when the communication control unit begins data communication via a base station which it has been determined is compatible with the first data communication protocol, the communication control unit makes a data communication request using the first data communication protocol if it is determined by the communication session status determining unit that a communication session layer establishment has been completed,
while if it is determined that the establishing of a communication session layer has not been completed, the communication control unit inhibits transmission of the data communication request,
wherein, in the case where the data communication request transmitted using the first data communication protocol is unsuccessful though it is judged that the session layer establishment has been completed, the communication control unit retries to send the data communication request up to a predetermined times,
wherein the communication control unit makes the retries using either the first or second data communication protocol based on determinations of the communication session status determining unit.

2. The radio communication terminal according to claim 1, wherein, in the case where the data communication request is unsuccessful using the first data communication protocol, the communication control unit transmits the data communication request using the second communication protocol if the number of retries reaches the predetermined times.

3. The radio communication terminal according to claim 1, wherein the communication session status determining unit determines that the completion of the communication session layer establishment by a completion of a session configuration and an establishment of a session with a base station.

4. The radio communication terminal according to clam 1, wherein the first data communication protocol is the EV-DO (Evolution-Data Only) protocol, and the second data communication protocol is the CDMA2000 1x (Code Division Multiple Access 2000 1x) protocol.

5. A radio communication method in which data communication is performed by either one of a first data communication protocol and a second data communication protocol that has a lower level of priority than that of the first data communication protocol being selected, having:
a first step in which it is determined whether or not the establishment of communication session layers has been completed; and
a second step in which either one of the first data communication protocol and the second data communication protocol is selected and data communication is performed on a selected protocol, wherein
when data communication is begun in the second step via a base station which it has been determined is compatible with the first data communication protocol, if it is determined in the first step that the establishing of a communication session layer has been completed, a data communication request is made using the first data communication protocol,
while if it is determined that the establishing of a communication session layer has not been completed, the communication control unit inhibits transmission of the data communication request,
wherein, in the case where the data communication request transmitted in the second step using the first data communication protocol is unsuccessful though it is judged that the session layer establishment has been completed, retries to transmit the data communication request up to a predetermined times,
wherein the retries are made in the second step using either the first or second data communication protocol based on determinations of the first step.

6. The radio communication method according to claim 5, wherein, in the case where the data communication request is unsuccessful in the second step using the first data communication protocol, a data communication request is transmitted using the second communication protocol if the number of reties reaches a predetermined times.

7. The radio communication method according to claim 5, wherein in the first step it is determined that the completion of the communication session layer establishment by a completion of a session configuration and an establishment of a session with a base station.

8. The radio communication method according to clam 5, wherein the first data communication protocol is the EV-DO (Evolution-Data Only) protocol, and the second data communication protocol is the CDMA2000 1x (Code Division Multiple Access 2000 1x) protocol.

* * * * *